(12) United States Patent
Lin

(10) Patent No.: US 8,818,364 B2
(45) Date of Patent: *__Aug. 26, 2014__

(54) METHOD AND APPARATUS FOR DETERMINING DEDICATE SEARCHING SPACE IN PHYSICAL DOWNLINK CONTROL CHANNEL

(71) Applicant: Innovative Sonic Limited, Port Louis (MU)

(72) Inventor: Ko-Chiang Lin, Taipei (TW)

(73) Assignee: Innovative Sonic Limited, Ebene (MU)

( * ) Notice: Subject to any disclaimer, the term of this patent is extended or adjusted under 35 U.S.C. 154(b) by 52 days.

This patent is subject to a terminal disclaimer.

(21) Appl. No.: 13/692,249

(22) Filed: Dec. 3, 2012

(65) Prior Publication Data

US 2013/0094383 A1 Apr. 18, 2013

Related U.S. Application Data

(63) Continuation of application No. 12/471,493, filed on May 26, 2009, now Pat. No. 8,326,292.

(60) Provisional application No. 61/058,217, filed on Jun. 3, 2008.

(51) Int. Cl.
*H04W 4/00* (2009.01)
*H04L 1/00* (2006.01)

(52) U.S. Cl.
USPC ............................ 455/434; 370/329; 370/252

(58) Field of Classification Search
USPC .................................. 455/434; 370/329, 252
See application file for complete search history.

(56) References Cited

U.S. PATENT DOCUMENTS

2010/0074215 A1* 3/2010 Park et al. ...................... 370/329
2011/0038275 A1* 2/2011 Kim et al. ...................... 370/252

* cited by examiner

*Primary Examiner* — Omoniyi Obayanju
(74) *Attorney, Agent, or Firm* — Blue Capital Law Firm, P.C.

(57) ABSTRACT

A method for determining a dedicate searching space (DSS) in a physical downlink control channel (PDCCH) for a user equipment (UE) of a wireless communication system is disclosed. The method includes steps of indicating the UE to monitor a semi-persistent scheduling cell radio network temporary identifier (SPS C-RNTI) in the PDCCH for receiving a semi-persistent scheduling grant, and determining the DSS utilized for monitoring the SPS C-RNTI according to a cell radio network temporary identifier (C-RNTI) of the UE.

10 Claims, 4 Drawing Sheets

METHOD AND APPARATUS FOR DETERMINING DEDICATE SEARCHING SPACE IN PHYSICAL DOWNLINK CONTROL CHANNEL

CROSS-REFERENCE TO RELATED APPLICATIONS

This application is a Continuation of U.S. patent application Ser. No. 12/471,493, filed on May 26, 2009, which claims the benefit of U.S. Provisional Application Ser. No. 61/058,217, filed Jun. 3, 2008, the entire disclosures of which are incorporated herein by reference.

FIELD

The present invention relates to a method and related communication device for determining a dedicate, searching space of a physical downlink control channel, and more particularly, to a method and related communication device for determining a dedicate searching space of a physical downlink control channel in a user equipment (UE) of a wireless communication system, so as to reduce loading of blind decoding operation.

DESCRIPTION OF PRIOR ART

Long Term Evolution wireless communications system (LTE system), an advanced high-speed wireless communications system established upon the 3G mobile telecommunications system, supports only packet-switched transmission, and tends to implement both Medium Access Control (MAC) layer and Radio Link Control (RLC) layer in one single communication site, such as in Node B alone rather than in Node B and RNC (Radio Network Controller) respectively, so that the system structure becomes simple.

In LTE system, a user equipment (UE) performs blind decoding in a searching space of physical downlink control channel (PDCCH) to acquire control information which a network terminal schedules to the UE. Generally, two types of searching spaces in PDDCH are defined, common searching space (CSS) and UE-specific searching space. CSS is utilized for transmitting common messages such as paging, broadcast messages, power control messages or Random Access Channel (RACH) response messages, etc. UE-specific searching space, also called dedicate searching space (DSS), is utilized for transmitting messages dedicated to a UE.

CSS is composed of the first 16 control channel elements (CCEs), while a starting location of DSS is derived from a user equipment identifier (UE-ID) such as a cell radio network temporary identifier (C-RNTI), for example, and a CCE Aggregation Level. Regarding how the UE determines the starting location of DSS by the UE-ID and the CCE Aggregation Level, please refer to related technical specifications, and is not given herein.

On the other hand, LTE system has two scheduling methods: dynamic scheduling (DS) and semi-persistent scheduling (SPS) A common dynamic grant allocated by DS is addressed to the C-RNTI of the UE, while an SPS grant is addressed to an SPS C-RNTI of the UE. In other words, the UE monitors the C-RNTI and the SPS C-RNTI in PDCCH to acquire the common dynamic grant and the SPS grant, respectively. However, when the UE waits for the SPS grant, the UE has to monitor both the SPS C-RNTI and the C-RNTI since the Node B may schedule the common dynamic grant at the same time.

Therefore, when the UE wants to receive the SPS grant, the UE not only determines a location of a DSS for the SPS grant according to the SPS C-RNTI, but also determines a location of a DSS for blind decoding the common dynamic grant according to the C-RNTI. Under such circumstances, comparing to the operation that the UE only receives the common dynamic grant, the UE needs to perform blind decoding operations in two different DSSs, respectively, causing the leading of blind decoding increases.

SUMMARY OF THE INVENTION

It is therefore an objective of the present invention to provide a method and related communication device for determining a dedicate searching space of a physical downlink control channel, to reduce the loading of blind decoding operation.

The present invention discloses a method for determining a dedicate searching space (DSS) of a physical downlink control channel (PDCCH) in a user equipment (UE) of a wireless communication system. The method includes steps of indicating the UE to monitor a semi-persistent scheduling cell radio network temporary identifier (SPS C-RNTI) in the PDCCH, for receiving a semi-persistent scheduling grant; and determining a DSS for monitoring the SPS C-RNTI according to a C-RNTI of the UE.

The present invention further discloses a communication device for determining a dedicate searching space (DSS) of a physical downlink control channel (PDCCH) in a user equipment (UE) of a wireless communication system. The communication device includes a processor for executing a program code, and a storage device, coupled to the processor, for storing the program code. The program code includes steps of indicating the UE to monitor a semi-persistent scheduling cell radio network temporary identifier (SPS C-RNTI) in the PDCCH, for receiving a semi-persistent scheduling grant; and determining a DSS for monitoring the SPS C-RNTI according to a C-RNTI of the UE.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
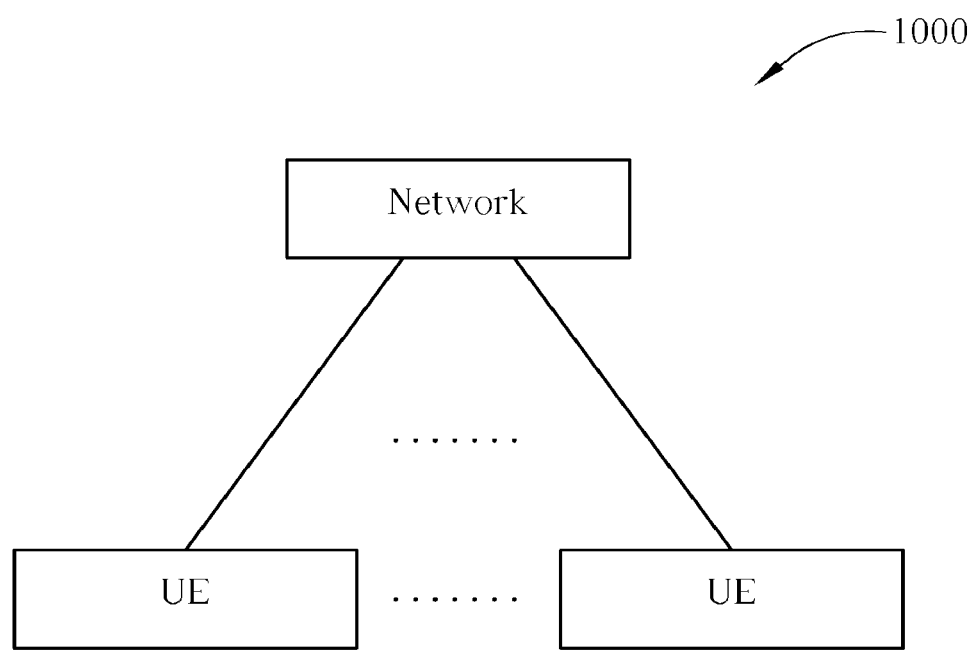
FIG. 1 is a schematic diagram of a wireless communication system.

Please refer to FIG. 1, which is a schematic diagram of a wireless communication system 1000. The wireless communication system 1000 is preferred to be a Long Term Evolution (LTE) communication system, and is briefly formed with a network terminal and a plurality of user equipments. In FIG. 1, the network terminal and the user equipments are simply utilized for illustrating the structure of the wireless communication system 1000. Practically, the network terminal may include a plurality of evolved base stations (eNBs), an evolved UMTS radio access network (EUTRAN) and so on according to actual demands, and the user equipments (UEs) can be apparatuses such as mobile phones, computer systems, etc.

Figure 2:
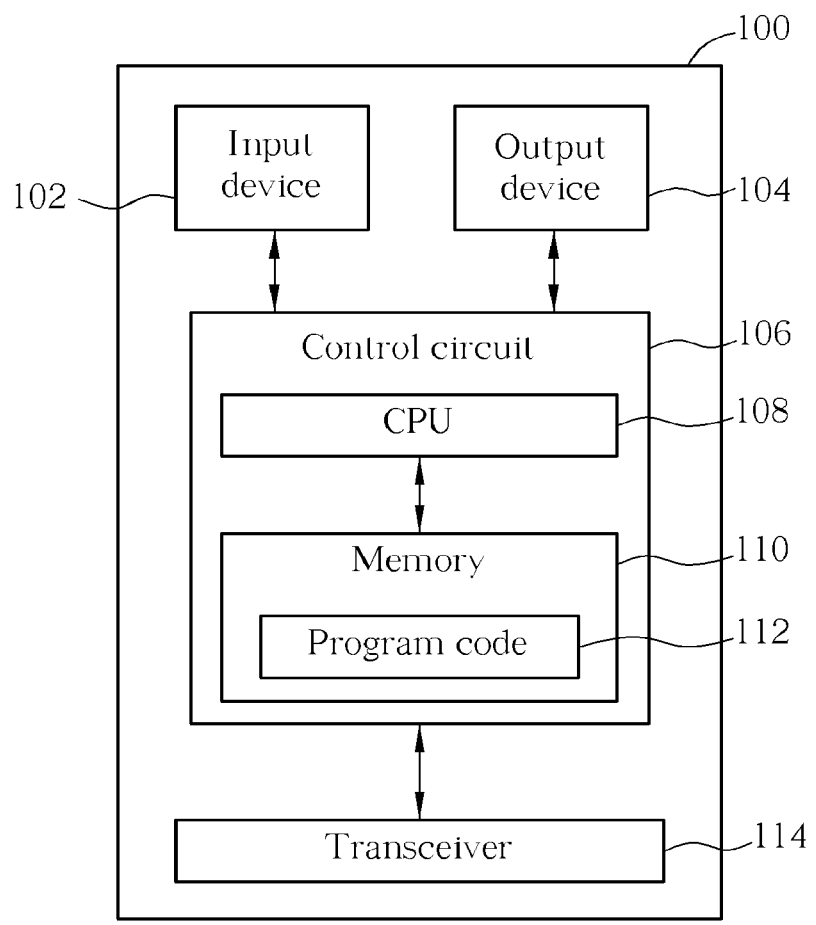
FIG. 2 is a functional block diagram of a wireless communication device.

Please refer to FIG. 2, which is a functional block diagram of a communication device 100. The communication device 100 can be utilized for realizing the UEs in FIG. 2. For the sake of brevity, FIG. 2 only shows an input device 102, an output device 104, a control circuit 106, a central processing unit (CPU) 108, a memory 110, a program 112, and a transceiver 114 of the communication device 100. In the communication device 100, the control circuit 106 executes the program 112 in the memory 110 through the CPU 108, thereby controlling an operation of the communication device 100. The communication device 100 can receive signals input by a user through, the input device 102, such as a keyboard, and can output images and sounds through the output device 104, such as a monitor or speakers. The transceiver 114 is used to receive and transmit wireless signals, delivering received signals to the control circuit 106, and outputting signals generated by the control circuit 106 wirelessly. From a perspective of a communication protocol framework, the transceiver 114 can be seen as a portion of Layer 1, and the control circuit 106 can be utilized to realize functions of Layer 2 and Layer 3.

Figure 3:
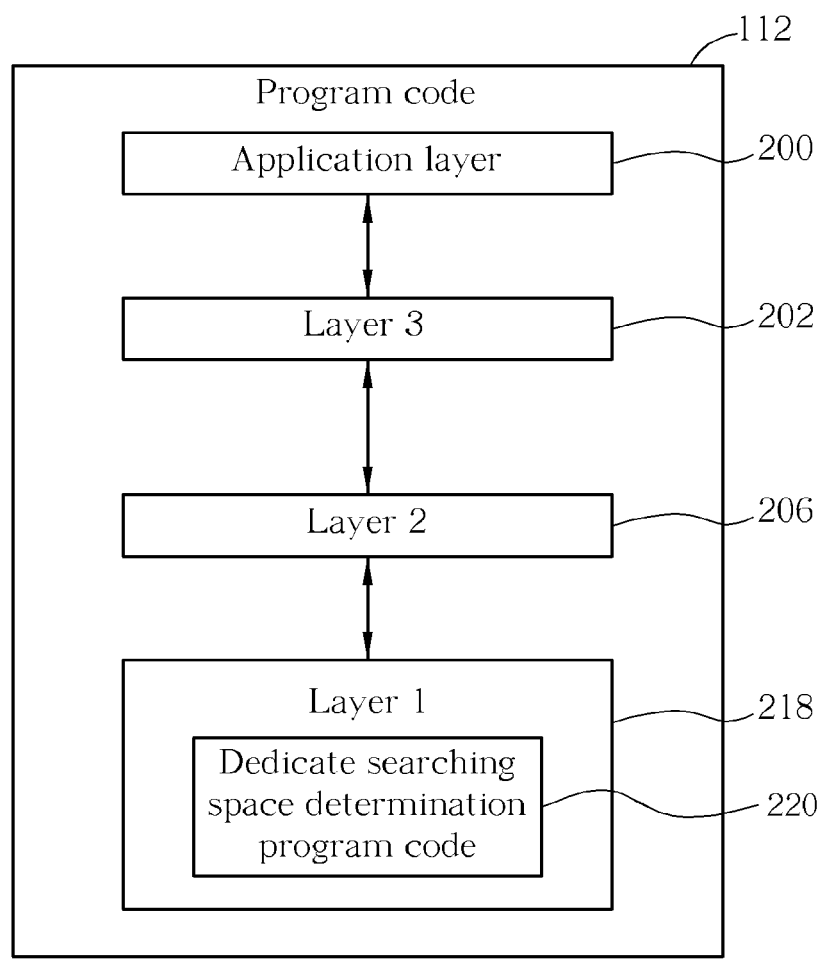
FIG. 3 is a schematic diagram of the program shown in FIG. 2.

Please continue to refer to FIG. 3. FIG. 3 is a schematic diagram of the program 112 shown in FIG. 3. The program 112 includes an application layer 200, a Layer 3 202, and a Layer 2 206, and is coupled to a Layer 1 218. The Layer 3 202 performs radio resource control. The Layer 2 206 includes an Radio Link Control (RLC) layer and a Medium Access Control (MAC) layer, and performs link control. The Layer 1 218 performs physical connections.

In LTE system, the Layer 1 218 can perform Mind decoding in a searching space of physical downlink control channel (PDCCH) to acquire control information which a network terminal schedules to the UE, such as a common dynamic grant or a semi-persistent scheduling (SPS) grant. Under such circumstances, the embodiment of the present invention provides a dedicate searching space determination program 220 in tire program 112, for reducing operation loading when the UE performs the blind decoding for the SPS grant in PDCCH.

Figure 4:
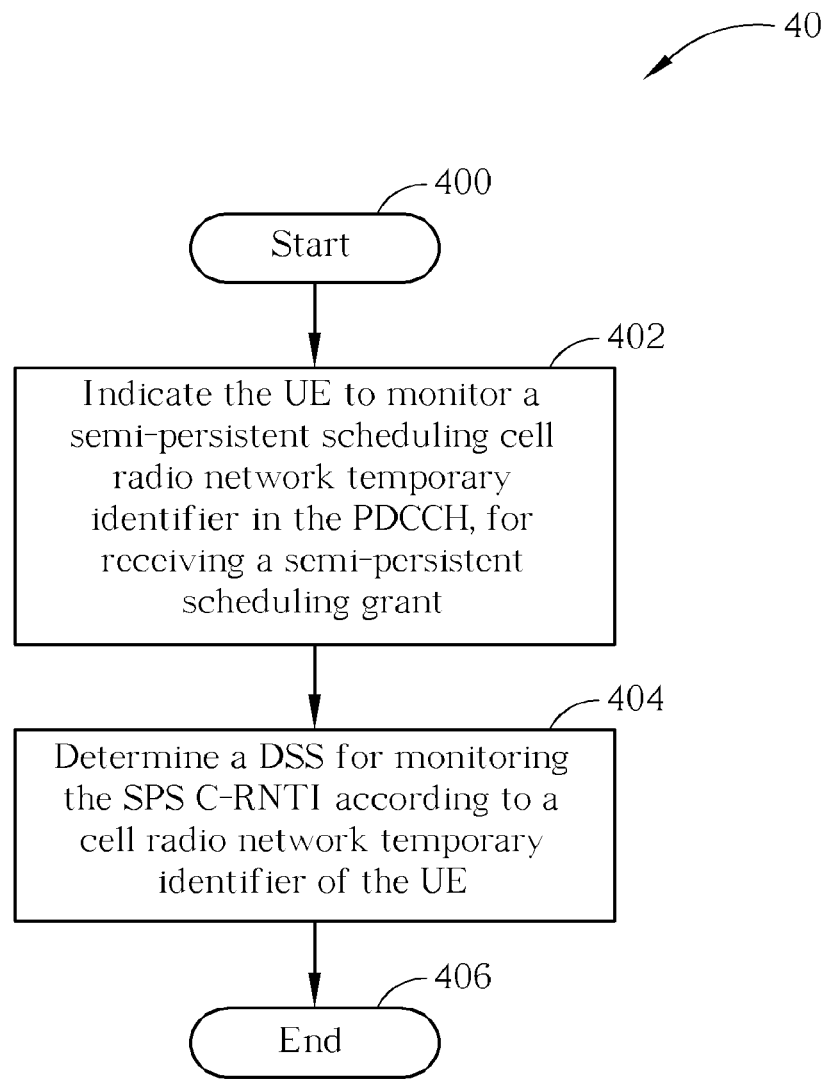
FIG. 4 is a flow chart of a process according to an embodiment of the present invention.

Please refer to FIG. 4, which is a flow chart 40 of a process according to an embodiment of the present invention. The process 40 is utilized for determining a dedicate searching space (DSS) of a physical downlink control channel (PDCCH) in a user equipment (UE) of a wireless communication system, and can be compiled into the dedicate searching space determination program 220. The process 40 includes the following steps:

Step 400: Start.

Step 402: Indicate the UE to monitor a semi-persistent scheduling cell radio network temporary identifier (SPS C-RNTI) in the PDCCH, for receiving a semi-persistent scheduling grant.

Step 404: Determine a DSS for monitoring the SPS C-RNTI according to a C-RNTI of the UE.

Step 406: End.

According to the process 40, the embodiment of the present invention first indicates the UE to monitor the SPS C-RNTI in the PDCCH for receiving the SPS grant. Then, the embodiment of the present invention determines the DSS for monitoring the SPS C-RNTI according to the C-RNTI of the UE.

As mentioned in the prior art, the UE needs to monitor the C-RNTI for receiving a common dynamic grant at the same time when monitoring the SPS C-RNTI, wherein a DSS for monitoring the C-RNTI is also determined according to the C-RNTI.

Therefore, when the UE wants to receive the SPS grant and monitors both the SPS C-RNTI and the C-RNTI at the same time, the embodiment of the present invention determines one common DSS for monitoring both the SPS C-RNTI and me C-RNTI according to the C-RNTI of the UE. Consequently, the UE only needs to perform blind decoding operation in one DSS, so the loading of the blind decoding in the UE can be reduced. Meanwhile, the embodiment of the present invention also requires that the network terminal arranges the PDCCH corresponding to the SPS C-RNTI in the DSS which is determined according to the C-RNTI. Therefore, it is ensured that the UE can monitor the SPS C-RNTI and the C-RNTI in the DSS at the same time.

Preferably, the embodiment of the present invention determines a starting location of the said DSS according to the C-RNTI and a control channel element (CCE) aggregation level. Under such circumstances, the UE performs the blind decoding for a plurality of PDCCH candidates contained in the DSS according to the CCE Aggregation Level, for acquiring the control information addressed to the UE, such as the SPS grant.

Furthermore, the step of monitoring the SPS C-RNTI and the C-RNTI at the same time further includes: performing the blind decoding in the DSS for generating a blind decoding result; and performing a cyclic redundancy check (CRC) demasking operation on the blind decoding result according to the SPS C-RNTI and the C-RNTI, respectively, for determining whether the control information is addressed to the UE.

Therefore, comparing to the prior art where the UE derives two different DSSs from the SPS C-RNTI and the C-RNTI, the UE according to the embodiment of the present invention only needs to determine one common DSS according to the C-RNTI and performs the blind decoding operation for one time. Consequently, the embodiment of the present invention can reduce the loading of tire blind decoding, and save the power consumption of the UE.

To sum up, when the UE wants to receive the SPS grant, the embodiment of the present invention determines the DSS for monitoring the SPS C-RNTI according to the C-RNTI, for reducing the loading of blind decoding operation, so as to save the power consumption of the UE.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for determining a dedicate searching space (DSS) of a physical downlink control channel (PDCCH) in a user equipment (UE) of a wireless communication system, the method comprising:

the UE monitoring a semi-persistent scheduling cell radio network temporary identifier (SPS C-RNTI) in the PDCCH, for receiving a semi-persistent scheduling grant; and determining a common DSS for monitoring both the SPS C-RNTI and a cell radio network temporary identifier (C-RNTI) of the UE according to the C-RNTI by:

performing blind decoding in the common DSS for generating a blind decoding result for both the SPS C-RNTI and the C-RNTI of the UE; and performing cyclic redundancy check demasking (CRC demasking) operation on the blind decoding result according to the SPS C-RNTI.

2. The method of claim 1 further comprising:
monitoring the C-RNTI for receiving a common dynamic grant at the same time when monitoring the SPS C-RNTI;
wherein a DSS for monitoring the C-RNTI is also determined according to the C-RNTI.

3. The method of claim 1, wherein determining the DSS for monitoring the SPS C-RNTI according to the C-RNTI comprises determining a starting location of the DSS according to the C-RNTI and a control channel element aggregation level (CCE Aggregation Level).

4. The method of claim 1, wherein the DSS comprises a plurality of PDCCH candidates.

5. The method of claim 1, wherein the wireless communication system is a Long-Term Evolution (LTE) communication system.

6. A communication device for determining a dedicate searching space (DSS) of a physical downlink control channel (PDCCH) in a user equipment (UE) of a wireless communication system, the communication device comprising:
a processor for executing a program code; and
a storage device, coupled to the processor, for storing the program code, wherein the program code comprises:
the UE monitoring a semi-persistent scheduling cell radio network temporary identifier (SPS C-RNTI) in the PDCCH, for receiving a semi-persistent scheduling grant; and
determining a common DSS for monitoring both the SPS C-RNTI and a cell radio network temporary identifier (C-RNTI) of the UE according to the C-RNTI by:
performing blind decoding in the common DSS for generating a blind decoding result for both the SPS C-RNTI and the C-RNTI of the UE; and
performing cyclic redundancy check demasking (CRC demasking) operation on the blind decoding result according to the SPS C-RNTI.

7. The communication device of claim 6, wherein the program code further comprises:
monitoring the C-RNTI for receiving a common dynamic grant at the same time when monitoring the SPS C-RNTI;
wherein a DSS for monitoring the C-RNTI is also determined according to the C-RNTI.

8. The communication device of claim 6, wherein determining the DSS for monitoring the SPS C-RNTI according to the C-RNTI comprises determining a starting location of the DSS according to the C-RNTI and a control channel element aggregation level (CCE Aggregation Level).

9. The communication device of claim 6, wherein the DSS comprises a plurality of PDCCH candidates.

10. The communication device of claim 6, wherein the wireless communication system is a Long-Term Evolution (LTE) communication system.

* * * * *